US010473036B2

United States Patent
Little

(10) Patent No.: US 10,473,036 B2
(45) Date of Patent: Nov. 12, 2019

(54) BLEED VALVE WITH NEUTRAL OR CLOSING BIAS

(71) Applicant: United Technologies Corporation, Farmington, CT (US)

(72) Inventor: Jonathan Little, West Hartford, CT (US)

(73) Assignee: United Technologies Corporation, Farmington, CT (US)

(*) Notice: Subject to any disclaimer, the term of this patent is extended or adjusted under 35 U.S.C. 154(b) by 444 days.

(21) Appl. No.: 15/424,348

(22) Filed: Feb. 3, 2017

(65) Prior Publication Data
US 2018/0223741 A1  Aug. 9, 2018

(51) Int. Cl.
*F02C 6/08* (2006.01)
*F02C 9/18* (2006.01)
*F04D 27/02* (2006.01)
*F01D 17/14* (2006.01)
*F02C 3/04* (2006.01)
*F04D 29/52* (2006.01)
*F01D 17/10* (2006.01)

(52) U.S. Cl.
CPC ............ *F02C 9/18* (2013.01); *F01D 17/141* (2013.01); *F02C 3/04* (2013.01); *F02C 6/08* (2013.01); *F04D 27/0215* (2013.01); *F04D 29/522* (2013.01); *F01D 17/105* (2013.01); *F05D 2220/32* (2013.01); *F05D 2240/55* (2013.01); *F05D 2260/56* (2013.01); *F05D 2260/57* (2013.01); *Y02T 50/671* (2013.01)

(58) Field of Classification Search
CPC .......... F02C 6/08; F02C 9/18; F04D 27/0207; F04D 27/023; F04D 27/0215; F01D 17/105
See application file for complete search history.

(56) References Cited

U.S. PATENT DOCUMENTS

| 3,094,270 A * | 6/1963 | Kent ................... F04D 27/0215 |
| | | 251/175 |
| 6,092,987 A | 7/2000 | Honda et al. |
| 6,802,691 B2 * | 10/2004 | Chlus ................... F01D 17/141 |
| | | 415/145 |
| 2015/0027130 A1 * | 1/2015 | LeBlanc ................... F02C 9/18 |
| | | 60/785 |

OTHER PUBLICATIONS

European Patent Office, European Search Report dated Jul. 4, 2018 in Application No. 18154691.2-1007.

* cited by examiner

*Primary Examiner* — Gerald L Sung
*Assistant Examiner* — Rene D Ford
(74) *Attorney, Agent, or Firm* — Snell & Wilmer, L.L.P.

(57) ABSTRACT

A compressor assembly may include a compressor case disposed about an axis. A bleed valve may be disposed about the compressor case to translate axially and/or rotationally relative to the compressor case. A first seal may be disposed in a forward seal housing of the bleed valve a first radial distance from the axis. A first sealing wall may be fixed relative to the compressor case and configured to engage the first seal. A second seal may be disposed in an aft seal housing of the bleed valve at a second radial distance from the axis. The first radial distance may be substantially equal to the second radial distance. A second sealing wall may be fixed relative to the compressor case and configured to engage the second seal.

19 Claims, 6 Drawing Sheets

BLEED VALVE WITH NEUTRAL OR CLOSING BIAS

FIELD

The disclosure relates generally to bleed valves in gas turbine engines.

BACKGROUND

Multi-spool compressors may contain bleed valves between the Low and High compressor stages to improve operability of the engine. Bleed valves may be subjected to large pressure loads due to internal flow path pressure and annular area between the bleed valve seals. The loads may limit sealing capacity and/or the rate at which the bleed valve is closed. Bleed valves operating against large loads may incur greater forces to actuation between the open and/or close positions. Larger actuators may be used in such high-pressure bleed valves to produce sufficient actuation force.

In addition to actuator size, other components in the engine may be designed with greater strength and stiffness to withstand operation in high load conditions. Larger components and actuators in turn result in greater engine weight. Larger actuators also result in greater electrical or hydraulic power consumption to drive the actuators.

SUMMARY

A bleed valve assembly is provided. The bleed valve assembly may include a bleed valve disposed about an axis and configured to translate axially or axially/rotationally relative to a compressor case. A first seal may be disposed in a forward seal housing of the bleed valve at a first radial distance from the axis. A second seal may be disposed in an aft seal housing of the bleed valve at a second radial distance substantially equal to the first radial distance.

In various embodiments, the bleed valve is split circumferentially into a plurality of segments. The first seal may protrude from the forward seal housing in an aft direction. The surface area of an aft-facing surface of the forward seal housing may be substantially equal to a surface area of a forward-facing surface of the aft seal housing. A bell crank may be coupled to the bleed valve. A bracket may be coupled to the bell crank and the compressor case. An actuator may be coupled to the bell crank and to move the bleed valve in an axial or axial/rotational direction. Multiple support links may be coupled to the bleed valve to passively support and guide the bleed valve in response to axial or axial/rotational translation of the bleed valve.

A compressor assembly is also provided. The compressor assembly includes a compressor case disposed about an axis. A bleed valve may be disposed about the compressor case to translate axially or axial/rotationally relative to the compressor case. A first seal may be disposed in a forward seal housing of the bleed valve a first radial distance from the axis. A first sealing wall may be fixed relative to the compressor case and configured to engage the first seal. A second seal may be disposed in an aft seal housing of the bleed valve at a second radial distance from the axis. The first radial distance may be substantially equal to the second radial distance. A second sealing wall may be fixed relative to the compressor case and configured to engage the second seal.

In various embodiments, the bleed valve may be spit circumferentially into a plurality of segments. The first seal may protrude from the forward seal housing in an aft direction. An aft-facing surface of the forward seal housing may have a surface area substantially equal to a surface area of a forward-facing surface of the aft seal housing. A bell crank may be coupled to the bleed valve. A bracket may be coupled to the bell crank and the compressor case. An actuator may be coupled to the bell crank and configured to urge the bleed valve in an axial or axial/rotational direction. Multiple support links may be coupled to the bleed valve and configured to passively support and guide the bleed valve in response to axial or axial/rotational translation of the bleed valve.

A gas turbine engine is also provided and comprises a compressor section configured to rotate about an axis. The compressor section may include a compressor case, a bleed valve disposed about the compressor case, first seal disposed in a forward seal housing of the bleed valve, and a second seal disposed in an aft seal housing of the bleed valve. The bleed valve may be configured to translate axially relative to the compressor case. The first seal may be disposed at a first radial distance from the axis, and the second seal is disposed at a second radial distance from the axis. A combustor section is disposed aft of the compressor section and in fluid communication with the compressor section. A turbine section may be disposed aft of the combustor section and in fluid communication with the combustor section.

In various embodiments, the first radial distance may be substantially equal to the second radial distance. An aft-facing surface of the forward seal housing may have a surface area substantially equal to a surface area of a forward-facing surface of the aft seal housing. A bell crank may be coupled to the bleed valve with an actuator coupled to the bell crank to urge the bleed valve in an axial or axial/rotational direction.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
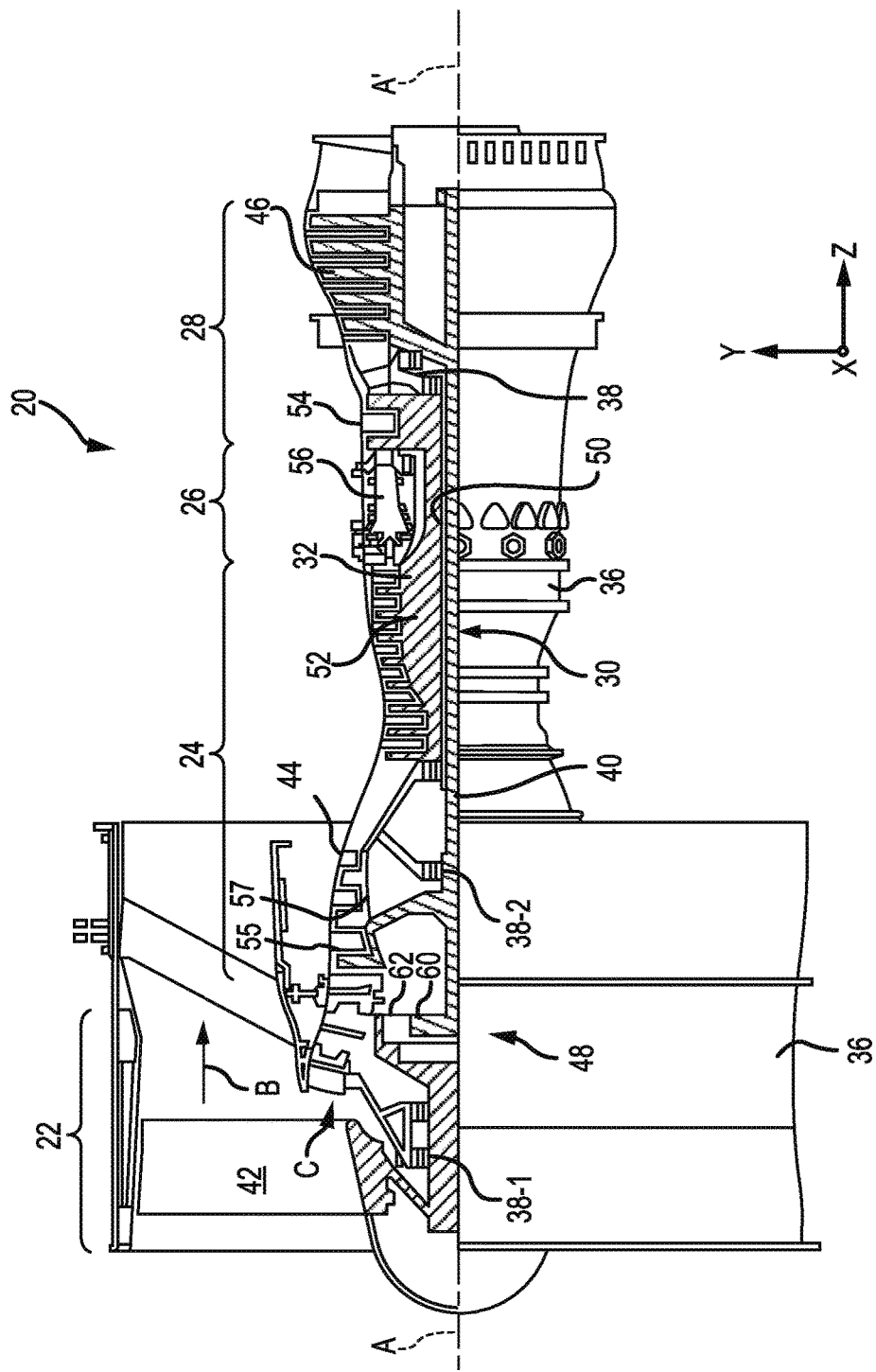
FIG. 1 illustrates an example of a gas turbine engine, in accordance with various embodiments.

Referring now to FIG. 1, an exemplary gas turbine engine 20 is shown, in accordance with various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a bypass-flow path B while compressor section 24 can drive coolant along a core-flow path C for compression and communication into combustor section 26 then expansion through turbine section 28. Although depicted as a two-spool turbofan gas turbine engine 20 herein, it should be understood that the concepts described herein are not limited to use with two-spool turbofans as the teachings may be applied to other types of turbine engines including turbojet, turboprop, turboshaft, or power generation turbines, with or without geared fan, geared compressor or three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Geared architecture 48 may comprise a gear assembly enclosed within a gear housing that couples inner shaft 40 to a rotating fan structure. High speed spool 32 may comprise an outer shaft 50 that interconnects a high-pressure compressor 52 and high-pressure turbine 54. Airfoils 55 coupled to a rotor of high-pressure turbine may rotate about the engine central longitudinal axis A-A' or airfoils 55 coupled to a stator may be rotationally fixed about engine central longitudinal axis A-A'. Airfoils 55 coupled to a stator may be held in place by inner shroud 57.

A combustor 56 may be located between high-pressure compressor 52 and high-pressure turbine 54. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow along core-flow path C may be compressed by low-pressure compressor 44 then high-pressure compressor 52, mixed and burned with fuel in combustor 56, then expanded over high-pressure turbine 54 and low-pressure turbine 46. Turbines 46, 54 rotationally drive the respective low speed spool 30 and high speed spool 32 in response to the expansion.

Figure 2:
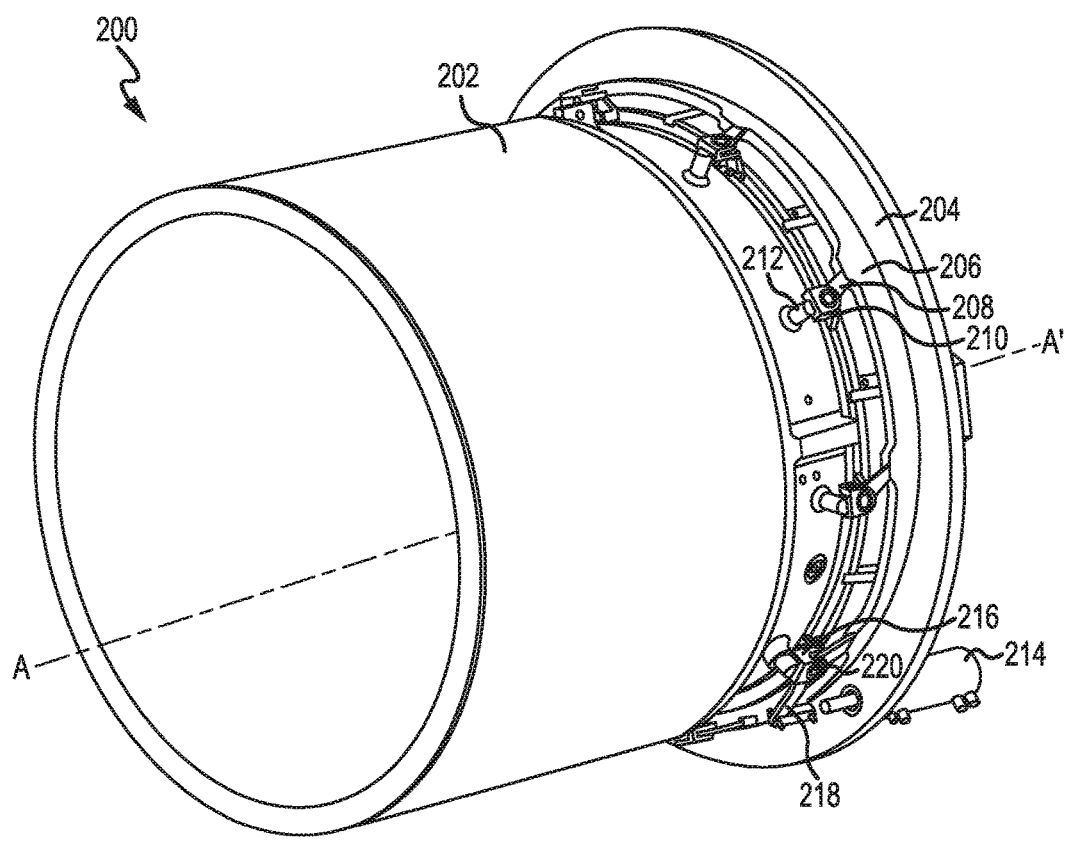
FIG. 2 illustrates a perspective view of a bleed valve in a compressor section, in accordance with various embodiments.
Figure 3:
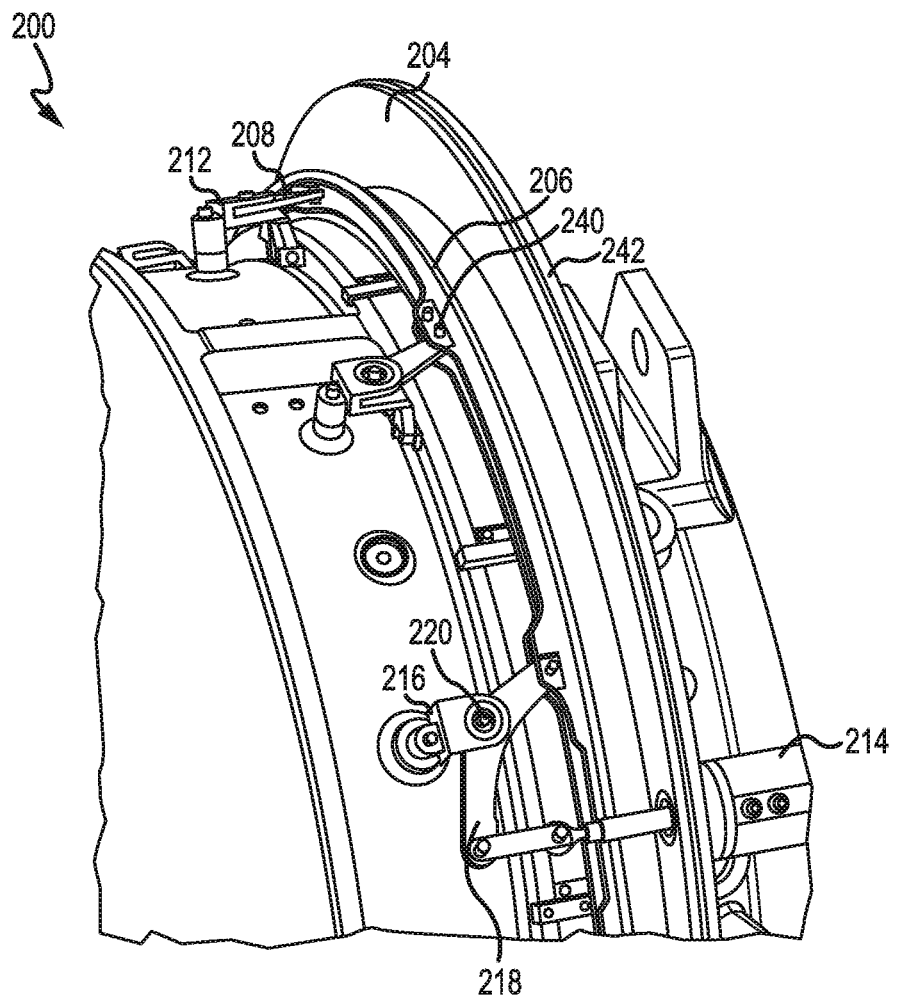
FIG. 3 illustrates a perspective view of a bleed valve having an actuator configured to translate the bleed valve forward and aft, in accordance with various embodiments.

With reference to FIGS. 2 and 3, a compressor assembly 200 is shown having a bleed valve assembly 206 according to various embodiments. Compressor assembly 200 may include compressor case 202 having an annular geometry. Bleed valve assembly 206 may be disposed about compressor case 202 and have an annular geometry. Bleed valve assembly 206 may translate forward and aft relative to compressor case 202.

Bleed valve assembly 206 may be coupled to compressor case 202 by bracket 212 and support links 208 of pivotal joint 210. Bracket may be coupled to compressor case 202. Support links 208 may be pivotally coupled to bracket 212. Support links 208 may also be coupled to bleed valve assembly 206 by fasteners 240 to passively support and/or guide bleed valve assembly 206 in response to linear/rotational translation. Pivotal joint 210 may enable axial translation/rotation of bleed valve assembly 206 in response to support link 208 pivoting relative to bracket 212.

In various embodiments, bell crank 218 may be coupled to bracket 216 to form pivotal joint 220. Bracket 216 may be coupled to compressor case 202. Bell crank 218 may also be coupled to actuator 214. Actuator 214 may urge bell crank 218 to rotate about pivotal joint 220 and drive axial translation/rotational movement of bleed valve assembly 206. Bleed valve 204 of bleed valve assembly 206 may be proximate flange 242 to define a bleed duct between the bleed valve and flange. In response to axial translation of bleed valve assembly 206, the distance between flange 242 and bleed valve 204 may increase allowing gas to escape through the bleed duct defined by flange 242 and bleed valve 204.

Figure 4:
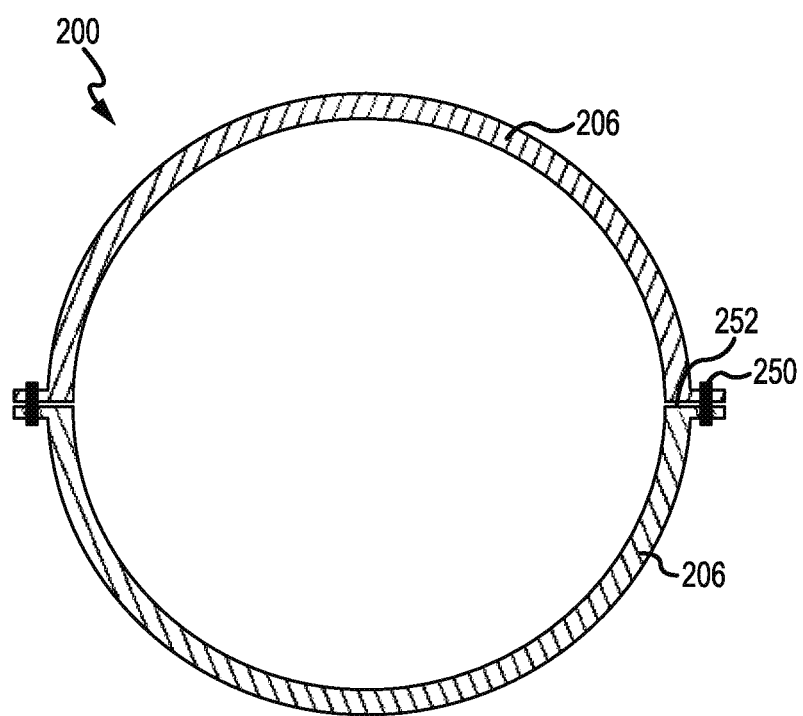
FIG. 4 illustrates an elevation view of a bleed valve having annular geometry as viewed from forward looking aft, in accordance with various embodiments.

Referring now to FIG. 4, bleed valve assembly 206 of compressor assembly 200 is shown from forward looking aft, in accordance with various embodiments. Bleed valve assembly 206 may be split into multiple segments joined by fasteners 250 along splits 252. Split bleed valve may enable installation and maintenance of the bleed valve (as shown in FIG. 5) about compressor cases installed in a gas turbine engine.

Figure 5A:
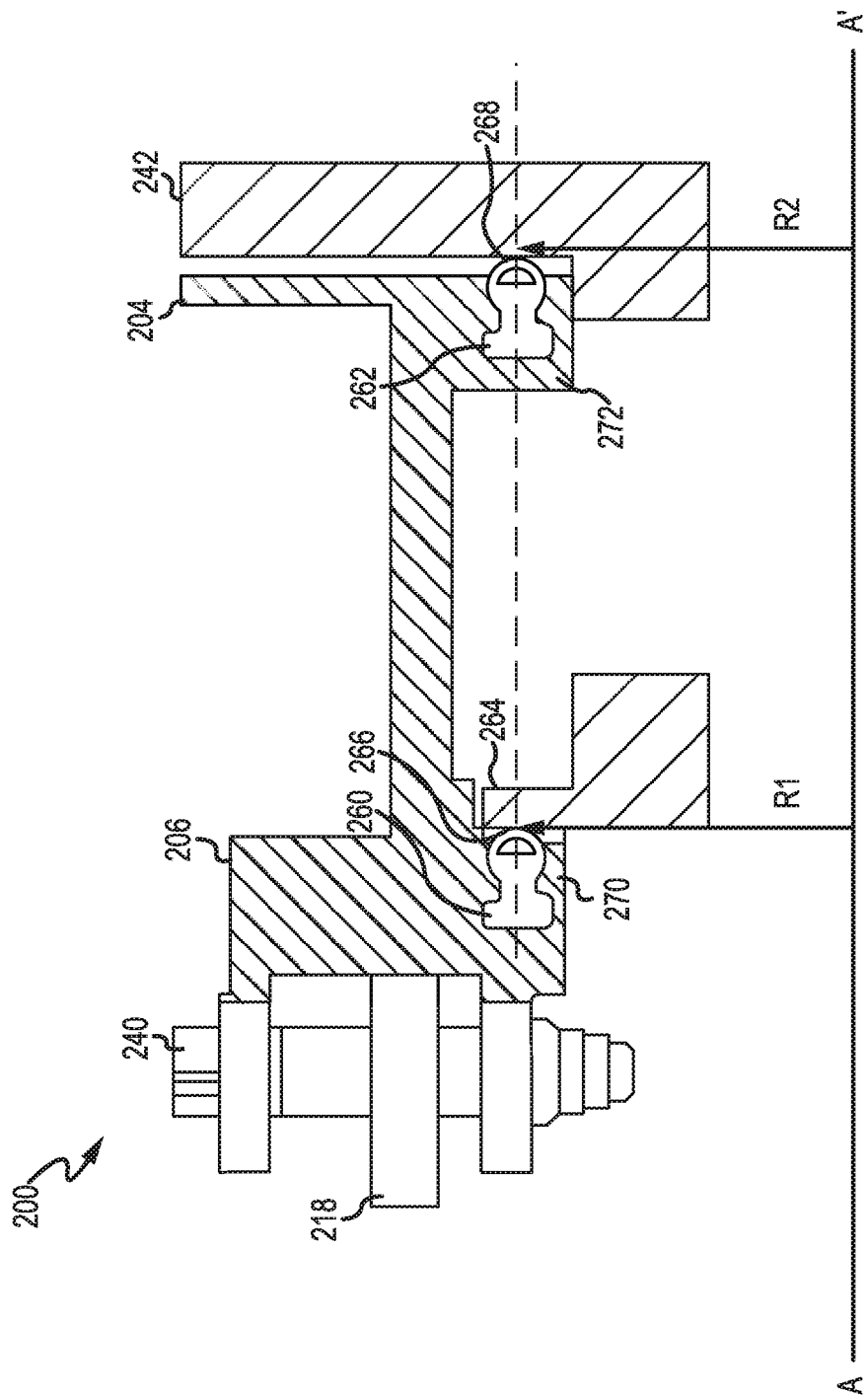
FIG. 5A illustrates a cross-sectional view of a bleed valve in a closed position having seals arranged at a selected radius from an axis of rotation, in accordance with various embodiments.
Figure 5B:
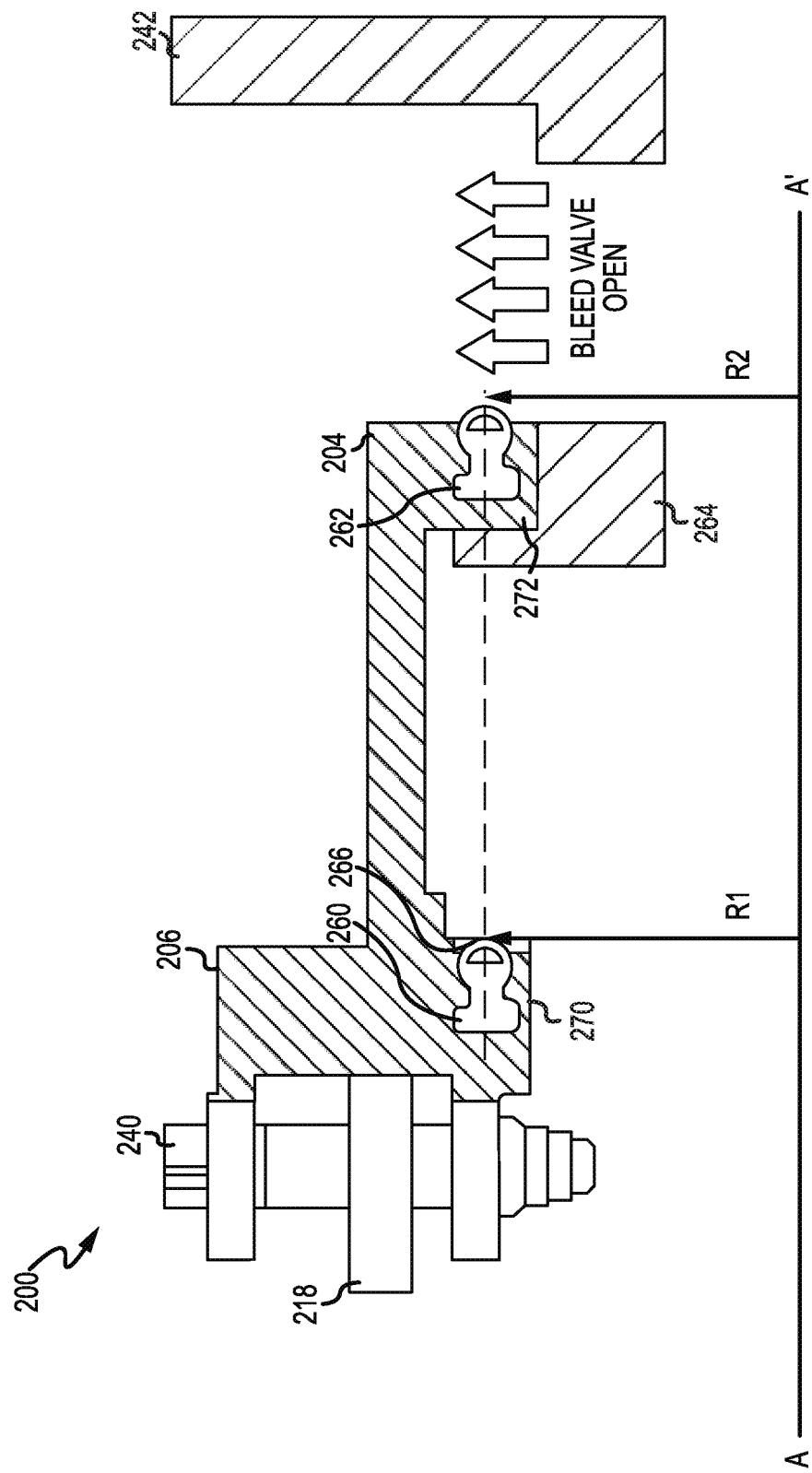
FIG. 5B illustrates a cross-sectional view of a bleed valve in an open position having seals arranged at a selected radius from an axis of rotation, in accordance with various embodiments.

Referring now to FIGS. 5A and 5B, cross-sectional views of compressor assembly 200 are shown in closed and open positions, respectively, in accordance with various embodiments. Compressor assembly includes bell crank 218 coupled to bleed valve assembly 206 by fastener 240. Bleed valve assembly 206 may be configured to translate in an axial/rotational direction along axis A-A'. Forward sealing wall 266 and aft sealing wall 268 may each be coupled to compressor case 202 (of FIG. 2). Forward sealing wall 266 and aft sealing wall 268 may thus be fixed in the axial direction relative to the compressor assembly with bleed valve assembly 206 configured to translate axially/rotationally relative to sealing walls.

In various embodiments, seal 260 retained in forward seal housing 270 of bleed valve assembly 206 may translate axially towards forward sealing wall 266 of internal flange 264. Seal 260 may protrude from forward seal housing 270 in the aft direction. Seal 260 may also compress in response to contact applied by forward sealing wall 266 caused by translation of bleed valve 204 in the aft direction. Seal 260 and/or forward seal housing 270 may be located a radial distance R1 from the axis A-A'. $R_1$ represents the effective radius of the forward seal 260 between the high pressure in the duct and the lower external pressure.

In various embodiments, seal 262, which is retained in aft seal housing 272 of bleed valve assembly 206 may translate axially towards aft sealing wall 268 of flange 242. Seal 262 may compress in response to contact applied by aft sealing wall 268 caused by translation of bleed valve 204 in the aft direction. Seal 262 and/or aft seal housing 272 may be located a radial distance R2 from the axis A-A'. $R_2$ represents the effective radius of the aft seal 262 between the high pressure in the duct and the lower external pressure.

In various embodiments, the difference between the duct pressure and lower external pressure may be applied to surfaces of bleed valve assembly 206 proportionally to the surface area exposed to the pressure of seal 262/aft seal housing 272 and/or seal 260/forward seal housing 270. Stated another way, the axial load applied to bleed valve assembly 206 may be a function of the pressure inside the flow path and the area it is acting on, which is an annulus between the forward and aft bleed valve seals. In that regard, the aft-facing surface of forward seal housing 270 and seal 260 may be subject to compressor pressure in the forward direction, and the forward facing surface of aft seal housing 272 and seal 262 may be subject to compressor pressure in the aft direction. The surface areas may thus be selected making the surface areas represented by $R_1$ and $R_2$ similar and tend to minimize net bias loads on bleed valve assembly 206 in the forward/aft directions.

In various embodiments, radius R1 and radius R2 may be thus selected to arrange the bleed valve assembly 206 into a neutral bias, closed bias, and/or open bias based on the pressure difference acting on the support structures and seals. As depicted, seal 260 and seal 262 may be located a substantially equal radial distance from axis A-A' (i.e., R1 is equal to R2). The term substantially equal may refer to distances that are within 5%, 10%, or 15% of one another. The substantially equal radial distance may result in a neutral bias of bleed valve assembly 206. R1 may also be selected as less than R2 to bias bleed valve assembly 206 in the forward or opening direction. R1 may also be selected as greater than R2 to bias bleed valve assembly 206 in the aft or closing direction.

By neutralizing and/or selectively biasing the pressure loads acting on the bleed valve, the actuator size and hydraulic pressure associated with sufficient driving force may be reduced. Lighter actuators may thus be used in engines with seals arranged as described herein. Actuators may also draw less power from the engine to generate the desired actuation force. In addition the linkage loads may be reduced and along with the wear resulting from use over time. System durability and longevity may thus be improved using the seals described herein. The stiffness of the mounting components can be reduced and made lighter because in response to the reduction of the max load condition. Splitting of the valve to facilitate assembly further offers improves maintenance time and expenses by providing access to the bleed valve seals.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A bleed valve assembly, comprising:
a bleed valve disposed about an axis and configured to translate relative to a compressor case;
a first seal disposed in a forward seal housing of the bleed valve, wherein the first seal is disposed at a first radial distance from the axis; and
a second seal disposed in an aft seal housing of the bleed valve, wherein the second seal is disposed at a second radial distance from the axis, wherein the first radial distance is substantially equal to the second radial distance and wherein the bleed valve is configured to have a neutral bias based on a pressure difference acting on the bleed valve.

2. The bleed valve assembly of claim 1, wherein the bleed valve is split circumferentially into a plurality of segments.

3. The bleed valve assembly of claim 1, wherein the first seal protrudes from the forward seal housing in an aft direction.

4. The bleed valve assembly of claim 1, wherein a surface area of an aft-facing surface of the forward seal housing is substantially equal to a surface area of a forward-facing surface of the aft seal housing.

5. The bleed valve assembly of claim 1, comprising a bell crank coupled to the bleed valve.

6. The bleed valve assembly of claim 5, comprising a bracket coupled to the bell crank and the compressor case.

7. The bleed valve assembly of claim 6, comprising an actuator coupled to the bell crank and configured to urge the bleed valve in at least one of an axial or rotational direction.

8. The bleed valve assembly of claim 6, comprising a support link coupled to the bleed valve and configured to passively support the bleed valve in response to at least one of axial or rotational translation of the bleed valve.

9. A compressor assembly, comprising:
a compressor case disposed about an axis;
a bleed valve disposed about the compressor case and configured to translate at least one of axially or rotationally relative to the compressor case;
a first seal disposed in a forward seal housing of the bleed valve, wherein the first seal is disposed at a first radial distance from the axis;
a first sealing wall fixed relative to the compressor case and configured to engage the first seal;
a second seal disposed in an aft seal housing of the bleed valve, wherein the second seal is disposed at a second radial distance from the axis, wherein the first radial distance is substantially equal to the second radial distance and wherein the bleed valve is configured to have a neutral bias based on a pressure difference acting on the bleed valve; and
a second sealing wall fixed relative to the compressor case and configured to engage the second seal.

10. The compressor assembly of claim 9, wherein the bleed valve is split circumferentially into a plurality of segments.

11. The compressor assembly of claim 9, wherein the first seal protrudes from the forward seal housing in an aft direction.

12. The compressor assembly of claim 9, wherein an aft-facing surface of the forward seal housing has a surface area substantially equal to a surface area of a forward-facing surface of the aft seal housing.

13. The compressor assembly of claim 9, comprising a bell crank coupled to the bleed valve.

14. The compressor assembly of claim 13, comprising a bracket coupled to the bell crank and the compressor case.

15. The compressor assembly of claim 14, comprising an actuator coupled to the bell crank and configured to urge the bleed valve in an axial direction.

16. The compressor assembly of claim 15, comprising a support link coupled to the bleed valve and configured to passively support the bleed valve in response to at least one of axial or rotational translation of the bleed valve.

17. A gas turbine engine, comprising:
a compressor section configured to rotate about an axis, the compressor section comprising:
a compressor case,
a bleed valve disposed about the compressor case and configured to translate axially relative to the compressor case,
a first seal disposed in a forward seal housing of the bleed valve, wherein the first seal is disposed at a first radial distance from the axis, and
a second seal disposed in an aft seal housing of the bleed valve, wherein the second seal is disposed at a second radial distance from the axis and wherein the bleed valve is configured to have a neutral bias based on a pressure difference based on a pressure difference acting on the bleed valve;
a combustor section aft of the compressor section and in fluid communication with the compressor section; and
a turbine section aft of the combustor section and in fluid communication with the combustor section.

18. The gas turbine engine of claim 17, wherein an aft-facing surface of the forward seal housing has a surface area substantially equal to a surface area of a forward-facing surface of the aft seal housing.

19. The gas turbine engine of claim 17, comprising:
a bell crank coupled to the bleed valve; and
an actuator coupled to the bell crank and configured to urge the bleed valve in an axial direction.

* * * * *